United States Patent [19]

Douglas et al.

[11] 4,182,979

[45] Jan. 8, 1980

[54] D-C. ELECTRIC TORQUING SYSTEM

[75] Inventors: Robert L. Douglas; William P. Jezo, both of Janesville, Wis.

[73] Assignee: Giddings & Lewis, Inc., Fond du Lac, Wis.

[21] Appl. No.: 874,742

[22] Filed: Feb. 3, 1978

[51] Int. Cl.² .............................................. H02P 7/00
[52] U.S. Cl. ................................... 318/434; 318/332; 318/689
[58] Field of Search ............... 318/434, 332, 317, 430, 318/432, 433, 689

[56] References Cited

U.S. PATENT DOCUMENTS

| | | | |
|---|---|---|---|
| 3,418,549 | 12/1968 | Emerson et al. | 318/689 |
| 3,477,007 | 11/1969 | Ducommun et al. | 318/434 |
| 3,783,716 | 1/1974 | Saito | 81/52.4 |
| 3,818,642 | 6/1974 | Seidel | 51/165.8 |
| 3,892,146 | 7/1975 | Yasoshima | 81/52.4 |
| 4,035,698 | 7/1977 | Söderberg | 318/434 |
| 4,066,942 | 1/1978 | Bardwell et al. | 318/434 |

Primary Examiner—B. Dobeck
Assistant Examiner—M. K. Mutter
Attorney, Agent, or Firm—Leydig, Voit, Osann, Mayer & Holt, Ltd.

[57] ABSTRACT

An electric torquing device comprises a d-c. motor for producing an output torque that varies in proportion to variations in the armature current, a power source for supplying d-c. current to the armature to produce an output torque, and regulating means for maintaining the d-c. current at a relatively low level during the run-on stage of a torquing operation. Sensing means responsive to a preselected parameter of the torquing operation, such as the velocity of the motor output, produces a control signal when the tightening stage of the torquing operation begins. Control means responsive to the control signal from the sensing means adjusts the regulation of the d-c. current to maintain the current supply to the armature at a relatively high level during the tightening stage of the torquing operation.

6 Claims, 6 Drawing Figures

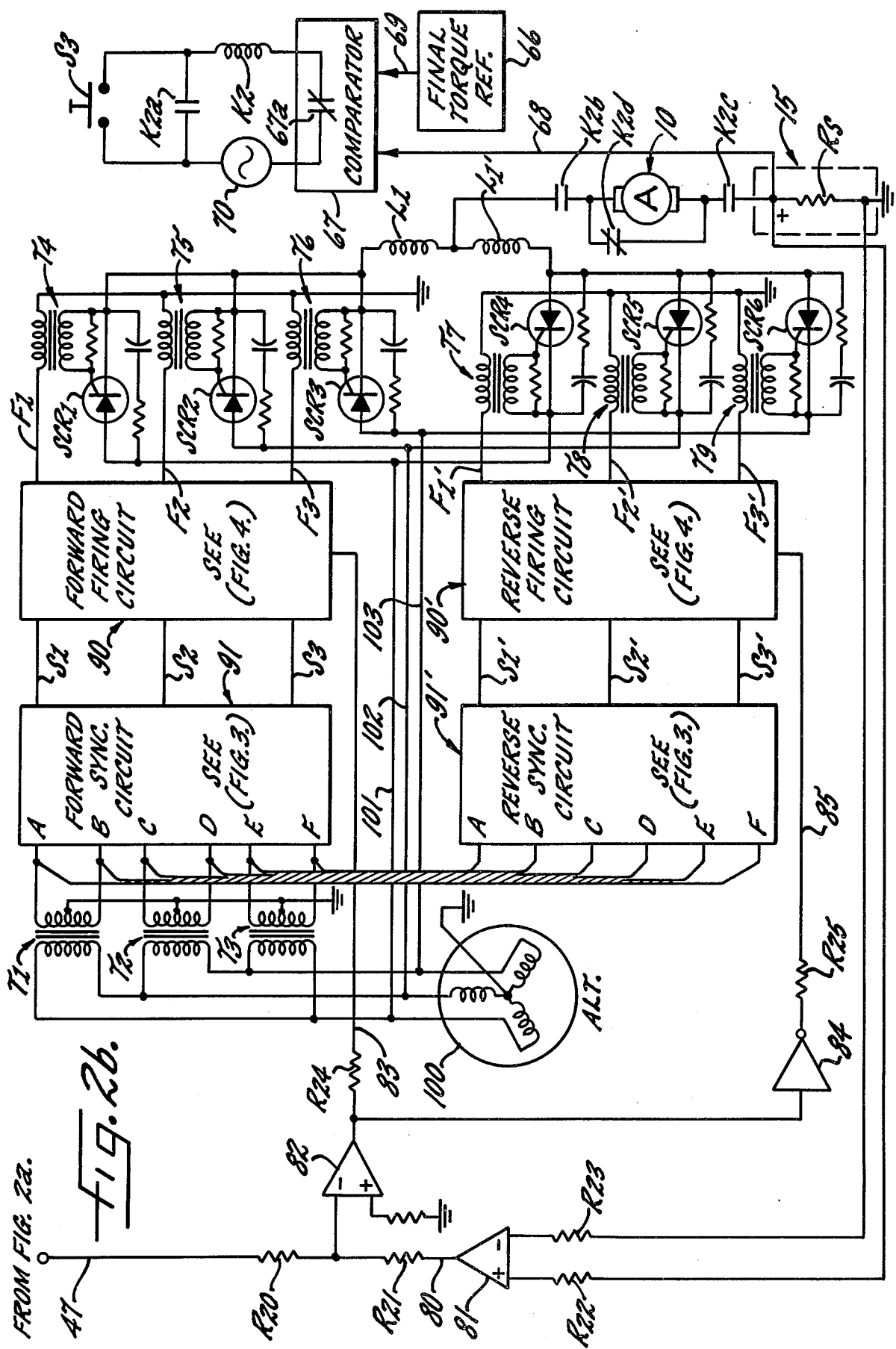

D-C. ELECTRIC TORQUING SYSTEM

DESCRIPTION OF THE INVENTION

The present invention relates generally to torquing devices and, more particularly, to electric torquing devices for tightening threaded fasteners and the like to predetermined torque levels.

It is a primary object of this invention to provide an improved electric torquing device that is capable of achieving a preselected torque level with a high degree of reliability and uniformity over a large number of torquing operations. Thus, a related object of the invention is to provide such an improved electric torquing device which provides an unusually low level of torque "scatter" over a large number of repetitive torquing operations.

It is another object of this invention to provide an improved electric torquing device of the foregoing type which minimizes inertial effects due to the velocity and acceleration of the torquing spindle in the final stage of a torquing operation.

A further object of this invention is to provide such an improved electric torquing device which provides a final torque on the workpiece that is substantially independent of the velocity, acceleration and inertia of the torquing spindle. In this connection, a related object of the invention is to provide such an improved electric torquing device which produces a precisely controlled and constant torque output, and which stops at the desired final torque level with negligible overshoot, undershoot, or spring-back.

Still another object of the invention is to provide such an improved electric torquing device that is extremely rapid.

Other objects and advantages of the invention will be apparent from the following detailed description and the accompanying drawings in which:

FIG. 1 is a block diagram of an electric torquing system embodying the invention;

FIGS. 2a and 2b, taken together, comprise a more detailed schematic diagram of an exemplary embodiment of the electric torquing system illustrated in FIG. 1;

While the invention will be described in connection with certain preferred embodiments, it will be understood that it is not intended to limit the invention to these particular embodiments. On the contrary, it is intended to cover all alternatives, modifications and equivalent arrangements as may be included within the spirit and scope of the invention as defined by the appended claims.

Figure 1:
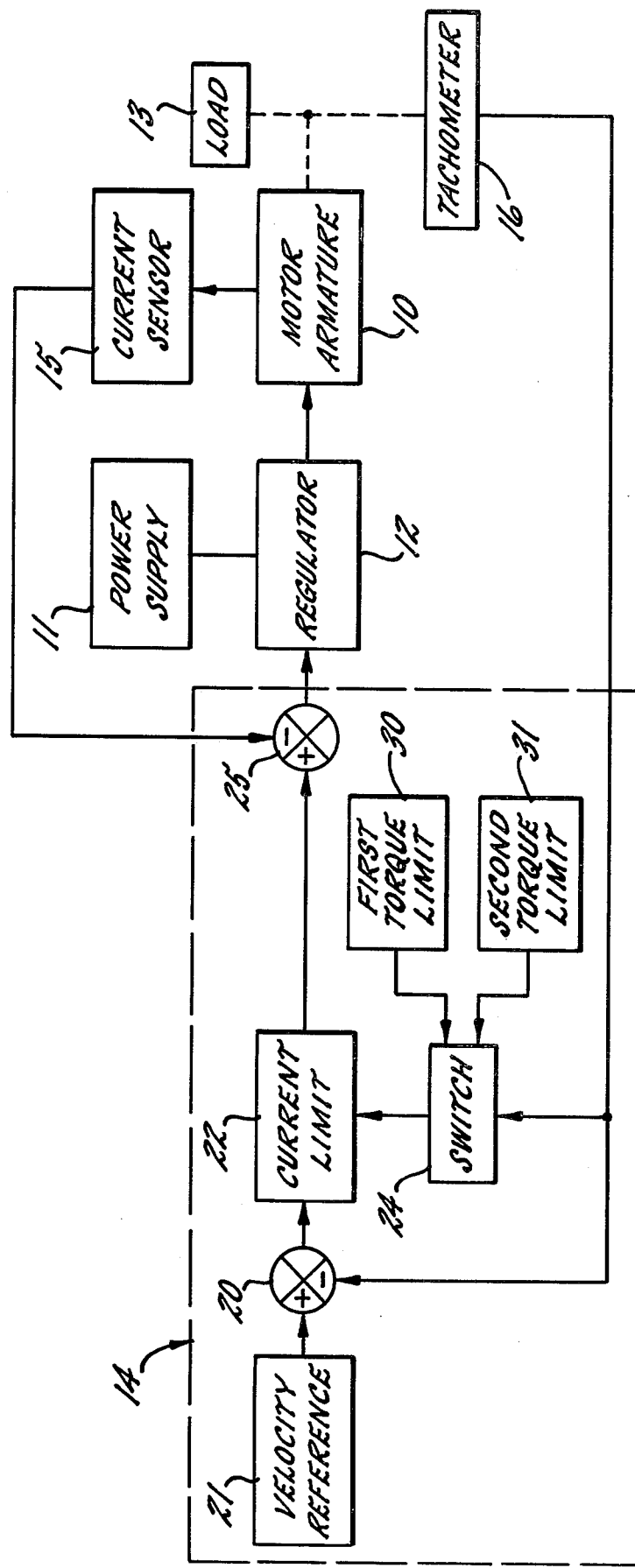

Turning now to the drawings and referring first to FIG. 1, the armature 10 of a d-c. drive motor is supplied with power from a power source 11 via a d-c. regulator 12. The output shaft of the motor containing the armature 10 normally carries a spindle (not shown) for applying torque to a load 13 such as a threaded fastener or other workpiece. The torque applied to this load 13, as well as the velocity of the motor output, is controlled by the regulator 12 which regulates the current supplied to the motor armature according to a signal from a control system 14 which receives feedback signals from an armature current sensor 15 and a tachometer 16. The signal from the current sensor 15 represents the magnitude of current flowing through the armature 10 at any given time, and this current level is in turn proportional to the actual output torque being produced by the motor. The signal from the tachometer 16 represents the actual velocity of the motor output.

The signal from the tachometer 16, representing the "actual velocity" of the motor output, is continuously applied to the inverting input of a summing junction 20. The other input to this junction 20 is a "reference velocity" signal having a polarity opposite that of the actual velocity signal. This reference velocity signal is derived from a reference voltage source 21 and applied to the non-inverting input of the summing junction 20. Thus, the "actual velocity" and "reference velocity" signals are algebraically summed at the junction 20 to produce a "velocity error" signal proportional to the difference between the actual velocity of the motor output and the reference velocity.

The direction of rotation of the motor is controlled by the polarity of the reference velocity signal from the source 21. For example, if the reference signal is positive, the motor output shaft is rotated in the clockwise direction, and the tachometer 16 produces a negative output signal proportional to actual velocity. For counterclockwise rotation of the motor shaft, the reference signal is negative, and the actual velocity signal from the tachometer is positive.

From the summing junction 20, the "velocity error" signal is supplied to a current-limiting circuit 22 which also receives a torque-limit signal from a switch 24. In response to these input signals, the current-limiting circuit 22 produces a "current command" signal which is applied to the non-inverting input of a summing junction 25. The other input to this junction is the "actual current" signal from the sensor 15, which has a polarity opposite that of the current command signal. Thus, the "current command" and "actual current" signals are algebraically summed at the junction 25 to produce a "current error" signal that is proportional to the difference between the current command and the actual current. This current error signal is supplied to the regulator 12 to control the level of current fed to the motor armature 10 from the power source 11. The armature current level, of course, controls the output torque applied by the motor to the load 13.

In accordance with one important aspect of the present invention, the current control system includes regulating means for maintaining the current supply to the motor armature at a relatively low level during the run-on stage of a torquing operation, until the motor stalls; and control means responsive to a stalled condition of the motor for adjusting the regulation of the armature current to maintain the current supply at a relatively high level during the tightening stage of the torquing operation.

During the run-on stage of a torquing operation, the system of this invention imposes a relatively low torque limit on the current-regulating system. Normally the actual load on the motor during run-on is so low that the armature current is limited by the velocity control signal rather than the torque limit. This run-on torque limit is set high enough to permit rapid run-on, but low enough to ensure that the motor stalls when the run-on is completed and the tightening stage is reached. Momentary stalling of the motor at this transition point, between the run-on and tightening stages, is desirable to prevent the workpiece from being brought to its final torque level in an abrupt manner that makes the final torque level more difficult to control. When a workpiece is advanced rapidly to its final torque level and then abruptly stopped, the likelihood of overshooting the desired final torque level, or springing back from that torque level, increases considerably, with a resulting increase in torque "scatter". That is, the final condition of the workpiece is determined not only by the torque level at which the driving force is removed from the torquing spindle, but also by the velocity and acceleration of the spindle and workpiece leading up to the torque level at which the driving force is removed.

In the preferred embodiment of the present invention, the momentary stalling of the motor at the end of the run-on permits the tightening stage to begin from a condition of substantially zero velocity and acceleration. Then, the system is automatically switched to a new and higher torque limit, and the output torque is advanced toward that higher limit in a gradual manner. Consequently, the spindle and workpiece approach the final torque level under precisely controlled conditions which permit the spindle and workpiece to be reliably stopped at the desired final torque level with negligible overshoot, undershoot, or spring-back. The final torque on the workpiece is thus substantially independent of velocity, acceleration and inertia.

Although the operation of the system as described above might be visualized as excessively slow and long, due to the stalling of the motor between the run-on and tightening stages, and the "gradual" increase in the output torque during the tightening stage, it must be understood that the time intervals involved are a matter of milliseconds. Thus, a tightening time of 100 milliseconds rather than 5 milliseconds makes little difference in the overall cycle time, but it makes a significant difference in the reliability with which the final result is attained. Similarly, stalling the motor for 10 milliseconds at the end of the run-on period is a negligible time loss, but it is immensely valuable in permitting precise control of the final torque level with a remarkable degree of consistency over a large number of torquing operations. As a result, torquing operations effected by the system of this invention are extremely rapid as well as more accurate and reliable than previous torquing systems.

In the illustrative system of FIG. 1, the first and second torque-limiting signals are produced by a pair of circuits 30 and 31 coupled to the current-limiting circuit 22 through the switch 24. Actuation of the switch 24 is controlled by the output signal of the tachometer 16, which produces a signal proportional to the velocity of the motor output shaft. Each time a new torquing operation is initiated, the switch 24 is positioned to connect the first torque-limit circuit 30 to the current-limiting circuit 22, thereby establishing a relatively low torque limit for the run-on stage of the torquing operation. When the motor stalls at the end of the run-on stage, the output signal from the tachometer 16 represents a zero-velocity condition, which actuates the switch 24 to connect the second torque-limiting circuit 31 to the current-limiting circuit 22. This establishes a higher torque limit for the tightening stage of the torquing operation, thereby permitting the armature current to be increased sufficiently to resume rotation of the motor shaft until the workpiece reaches the preselected final torque level.

When the final torque level is attained, the signal supplied to the summing junction 25 from the current sensor 15 balances the "current command" signal from the current-limiting circuit 22. This terminates any further increase in the current supply to the motor armature, and the workpiece is then held at the final torque level until the supply of current to the armature is cut off. If desired, the workpiece can be held at the final torque level for a preselected interval before the armature current is cut off, or the current can be cut off as soon as the final torque level is reached. After the current has been cut off, the spindle on the motor shaft is detached from the workpiece, such as by retracting the entire torquing assembly from the workpiece, thereby completing the torquing operation.

Figure 2A:
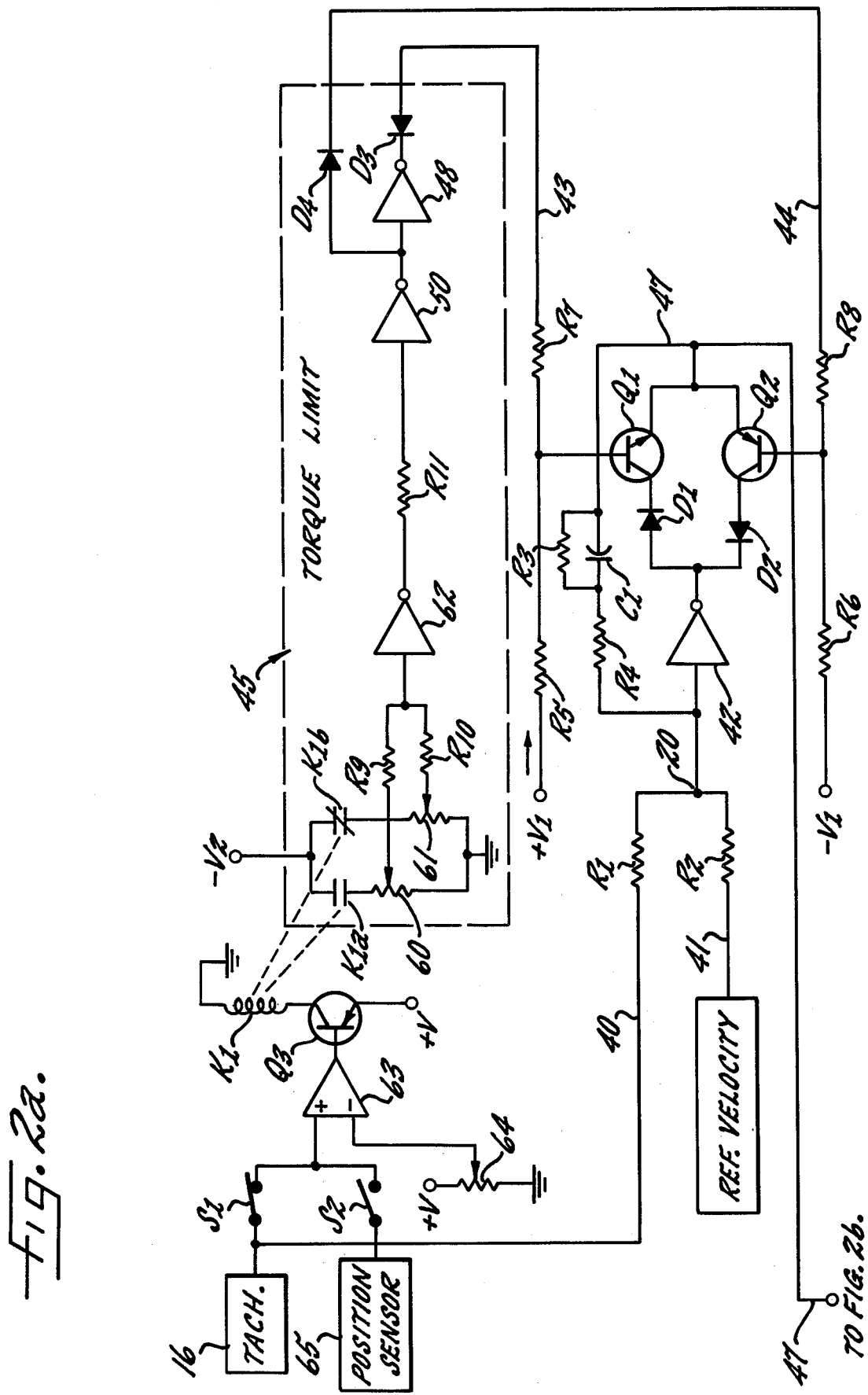

A preferred embodiment of the generalized control system of FIG. 1 is illustrated in the schematic diagram formed by a composite of FIGS. 2a and 2b. Turning first to FIG. 2a, the actual velocity signal from the tachometer 16 is received on line 40, and the reference velocity signal is received on line 41. These two d-c. signals are algebraically summed via a pair of resistors R1 and R2 at the input to an operational amplifier 42. The reference velocity signal and the actual velocity signal are of opposite polarity so the algebraic sum of these two signals is the velocity error signal (the output of amplifier 42) representing any difference between the reference and actual velocities. The polarity of the error signal depends on the polarities of the reference velocity and actual velocity signals, and the polarity determines the direction of rotation of the motor shaft. That is, the error signal is a d-c. voltage whose magnitude is proportional to the difference, if any, between the absolute values of the d-c. voltages on the lines 40 and 41, and whose polarity determines the direction of rotation.

The output of the operational amplifier 42 is coupled back to the input through a parallel combination of resistor R3 and capacitor C1 and a series resistor R4. The resistors R3 and R4 create a proportional term, and the capacitor C1 creates an integral term in the overall transfer function of the amplifier 42—as is well known. The ultimate integrated output on line 47 forms a current command voltage which is algebraically summed with an actual current signal to produce a current error signal which controls the level of current supplied to the motor armature 10. Whenever the armature current is below the reference level so that the actual current level is less than the reference level, the magnitude of the current error voltage increases and the current supply to the motor armature is increased. Conversely, when the armature current is above the reference level so that the actual current level is greater than the reference level, the magnitude of the current error signal decreases so that the current supply to the motor armature is reduced.

Within the integrating feedback loop of the amplifier 42, the amplifier output is passed thrugh the emitter-collector circuits of a pair of transistors Q1 (npn) and Q2 (pnp) via respective diodes D1 and D2. Diode D1 and transistor Q1 pass positive signals to the line 47, while diode D2 and transistor Q2 pass negative signals to line 47. The bases of these two transistors Q1 and Q2 are connected to positive and negative voltage sources +V1 and −V1 via resistors R5 and R6, respectively. In addition, the bases of Q1 and Q2 receive a pair of current-limiting signals on lines 43 and 44, via resistors R7 and R8, from a torque-limit circuit 45 so that the magnitude of the ultimate integrated signal on line 47 can never exceed, in either the positive or negative direction, whatever voltage appears on the lines 43 and 44. More specifically, the voltages on lines 43 and 44 control the conductivity of the corresponding transistors Q1 and Q2 so that the signal transmitted from the amplifier 42 through Q1 or Q2 can never exceed the limit set by the signal on the corresponding line 43 or 44.

The conductivity of the transistors Q1 and Q2 is controlled by the voltage levels on their bases, which are the voltage levels between a pair of resistors R5 and R7 for Q1 and between resistors R6 and R8 for Q2. The voltage level between resistors R5 and R7 is determined by the difference between a voltage source $+V1$ and a limiting signal on line 43 from a diode D3 and an operational amplifier 48 in the torque-limit circuit 45. Thus, it can be seen that the input signal supplied to the amplifier 48 in the limit circuit controls the base voltage on the transistor Q1 by controlling the current flow through resistors R5 and R7 from the source $+V1$. Similarly, the voltage level between resistors R6 and R8 is determined by the difference between a voltage source $-V1$ and a limiting signal on line 44 from a diode D5 and amplifier 50 in circuit 45. Thus, the input signal to the amplifier 50 controls the base voltage on the transistor Q2 by controlling the current flow through resistors R6 and R8. It will be appreciated that the reason for the two limiting signals (lines 43 and 44) is to provide a limit for both positive and negative outputs from the amplifier 42, i.e., for both forward and reverse motion of the motor.

Turning now to the torque-limit circuit 45, the torque limits during the run-on and tightening stages of each torquing operation are determined by a pair of potentiometers 61 and 60, respectively. The wipers of these potentiometers are connected to an inverting amplifier 62 via resistors R9 and R10. Only one of the potentiometers 60 and 61 is connected to the amplifier 62 at any given time, as determined by a pair of relay contacts K1a and K1b actuated by a relay coil K1. When the coil K1 is de-energized, the normally closed contacts K1b connect a voltage source $-V2$ to the potentiometer 61, thereby supplying an input voltage to the amplifier 62 that produces an output signal level respresenting a relatively low torque limit for the motor during the run-on stage. The relay coil K1 is always in this de-energized condition during the run-on stage of a torquing operation because the tachometer 16 supplies a differential amplifier 63 with an input signal greater than its reference signal derived from a potentiometer 64. As a result, the output of the differential amplifier 63 reverse biases a transistor Q3 to cut off the supply of energizing current to the coil K1 as long as the motor velocity remains above the reference level established by the potentiometer 64. When the coil K1 is subsequently energized, the contacts K1b are opened and the normally open contacts K1a close to switch the voltage source $-V2$ from the potentiometer 61 to the potentiometer 60, thereby supplying an input voltage to the amplifier 62 that produces an output signal level representing a relatively high torque limit for the motor.

To effect the switch from the low torque limit to the high torque limit at the end of the run-on stage of a torquing operation, when the drive motor stalls, the stalled condition of the motor is sensed by the tachometer 16 and used to energize the relay coil K1. Thus, the coil K1 remains de-energized from the commencement of each torquing operation to the end of the run-on stage, thereby setting the low torque limit for the run-on stage, and the coil K1 is energized during the tightening stage of the torquing operation, thereby setting the high torque limit for the tightening stage. Energization of the coil K1 is effected by turning on the transistor Q3 when the tachometer output signal drops below the level of the reference signal from the potentiometer 64.

Whereas the run-on stage is terminated in response to a stalled condition of the drive motor, the tightening stage is terminated in response to attainment of a preselected final torque level. During this tightening stage, the relay coil K1 is never de-energized because the motor speed never increases to the level at which the tachometer output exceeds the reference signal from the potentiometer 64. When the preselected final torque level is attained, the voltage on the armature side of the sensing resistor Rs rises to the same level as a final-torque-reference voltage from a source 66. These two voltages are supplied to a comparator 67 via lines 68 and 69 so that when the two voltages are equal, the comparator opens a pair of contacts 67a to de-energize a relay coil K2.

The relay K2 is the main on-off control for the motor armature power circuit. To turn the power on at the beginning of a torquing operation, a momentary "start" switch S3 is closed to energize the coil K2 from a source 70, thereby closing a pair of contacts K2a to lock in the coil K2 after the switch S3 opens. At the same time, coil K2 closes normally open contacts K2b and K2c in series with the armature 10 and opens normally closed contacts K2d in parallel with the armature, thereby activating the power circuit to the armature. The circuit remains activated until the coil K2 is de-energized by the comparator 67 when the preselected final torque value is reached, at which time contacts K2b and K2c are opened and contacts K2d are closed.

As an alternative to the use of the stalled condition of the motor to energize the coil K1, the coil K1 may be energized in response to advancement of the workpiece to a predetermined position, e.g., a position where it is known that the transition from the run-on stage to the tightening stage will normally occur. For this mode of operation, a switch S1 is opened to disconnect the tachometer 16 from the amplifier 63, and a switch S2 is closed to connect a position sensor 65 to the positive input of the amplifier 63. Thus, the relay coil K1 will be energized when the output signal from the position sensor 65, which varies in magnitude in proportion to changes in the workpiece position, drops below the level of the reference signal from the potentiometer 64.

Returning now to the amplifier 62 that receives the signals from the potentiometers 60 and 61 the output of this amplifier is passed through a resistor R11 to the inverting amplifier 50. The output of the amplifier 50 is a negative signal which is applied to the inverting amplifier 48 and the anode of the diode D4 as a negative torque limit signal for line 44. The output of the amplifier 48 is a positive signal and is applied to the cathode of the diode D3 as a positive torque limit signal for line 43. The purpose of the diodes D3 and D4 is to block the transmission of similar signals back to the amplifiers 48 and 50.

Returning now to the signal produced on line 47, this signal is used as a current command signal which is compared with an actual current signal on line 80 via resistor R21. This actual current signal is the output of a differential amplifier 81 which receives its input signals via resistors R22 and R23 from opposite sides of a resistor Rs in series with the motor armature 10; the voltage drop across this resistor Rs is proportional to the actual current flow through the motor armature and, therefore, to the output torque being produced by the motor. Comparison of the actual current signal on line 80 with the command signal on line 47 produces a current error signal which is used to control the level of current supplied to the motor armature.

Because the current command signal on line 47 represents the difference between the actual and reference velocities—except when this velocity difference is overridden by a torque "limit" signal—the current command signal calls for the current required to maintain the actual velocity equal to the reference velocity. This is typically the controlling factor when the torquing system is in the run-on stage, because the torque load on the motor during that stage is normally sufficiently small that there are no large velocity error signals. Thus, the run-on stage is normally "velocity-controlled," which means that the current supplied to the motor armature is dictated by the velocity reference signal. The velocity called for by this signal is usually relatively high so that the workpiece can be rapidly "run-on."

At the end of the run-on stage, the actual velocity drops off quickly due to the workpiece approaching the tightening position, where it meets an increasing resistance and imposes an increasing torque load on the motor. Consequently, the velocity error signal increases rapidly and is soon limited by the torque limit signal. (The velocity limit signal does not usually come into play unless an abnormal condition occurs.) Thus, the torque limit signal actually becomes the current reference signal at the end of the run-on stage, and the magnitude of this torque limit is relatively low because it is set by the "low torque" potentiometer 61. The magnitude of the actual current signal quickly rises to the level of the "low" torque limit, so that no further increase in current is supplied to the drive motor. As a result, the drive motor cannot supply the torque required to overcome its suddenly increased load, and stalls.

As the motor stalls, the tachometer output signal drops to the level at which the relay coil is energized, thereby increasing the torque limit to the level set by the "high torque" potentiometer 60. More specifically, energization of the coil K1 opens contacts K1b and closes contacts K1a, thereby supplying current to the "high torque" potentiometer 60 rather than the "low torque" potentiometer 61. The potentiometer 60 develops a substantially higher voltage thereby immediately increasing the "torque limit" signal. This increased torque limit signal continues to override the velocity error signal, even though there is still a large difference between the reference velocity and the zero velocity of the stalled motor. The increase in the torque limit produces a relatively large current error signal calling for increased armature current.

The resulting increase in armature current brings the motor out of its stalled condition and begins to advance the workpiece again. This is the beginning of the tightening stage, during which the workpiece encounters rapidly increasing resistance and is advanced relatively slowly in a torque-controlled mode. That is, it is the magnitude of the torque limit signal rather than the reference velocity signal that determines the rate at which the workpiece is advanced during the tightening stage.

The current error signal is produced by algebraically summing the current reference signal and the actual current signal at the inverting input of an operational amplifier 82. Thus, the current reference signal on line 47 is supplied to the amplifier 82 from line 47 via resistor R20, and the actual current signal is supplied to amplifier 82 from line 80 via resistor R21. The resulting output signal from the amplifier 82 controls the level of armature current and is passed through a resistor R24 to a line 83 for "forward" control, and through an inverter 84 and resistor R25 to a line 85 for "reverse" control. That is, the signal on line 83 controls the armature current level during "forward" motion of the drive motor, e.g., during clockwise rotation of the motor-driven spindle, and the signal on line 85 controls the current level during "reverse" motion, e.g., counterclockwise rotation.

Figure 3:
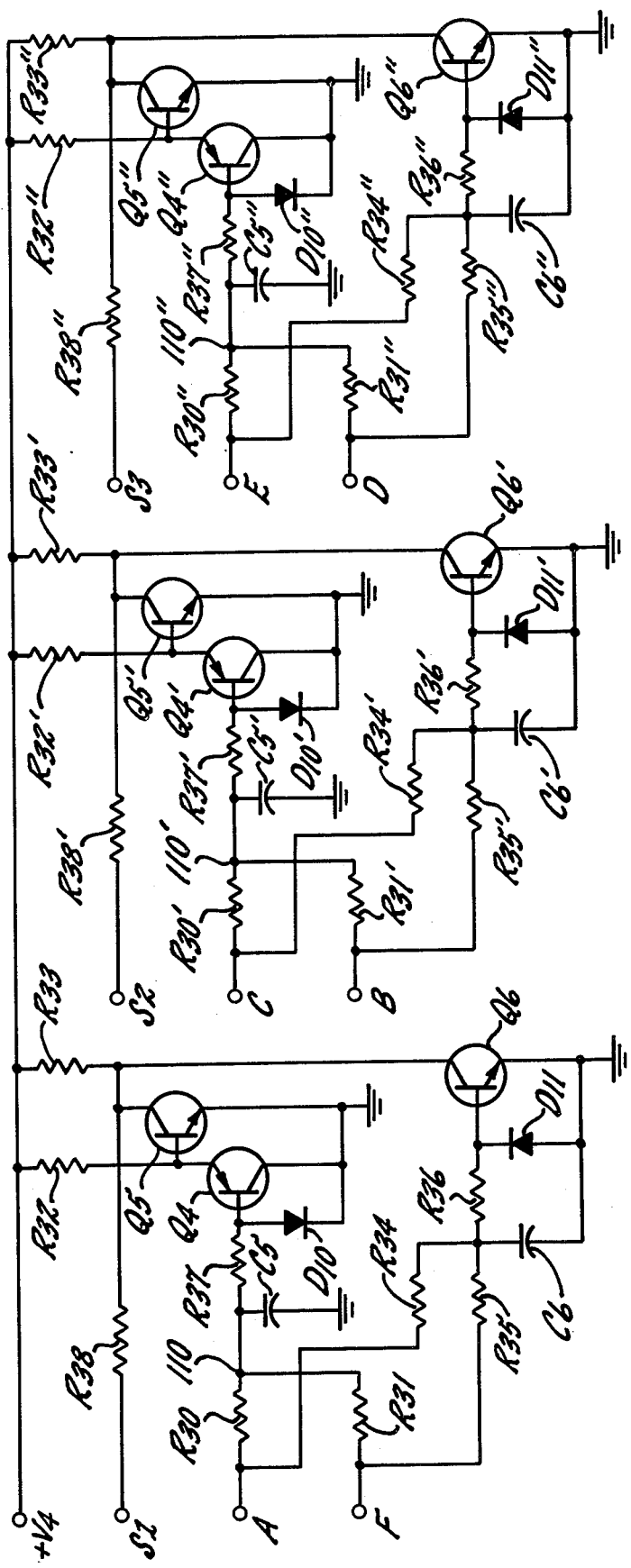
FIG. 3 is a circuit diagram of the synchronizing circuits shown in block form in FIG. 2b.
Figure 4:
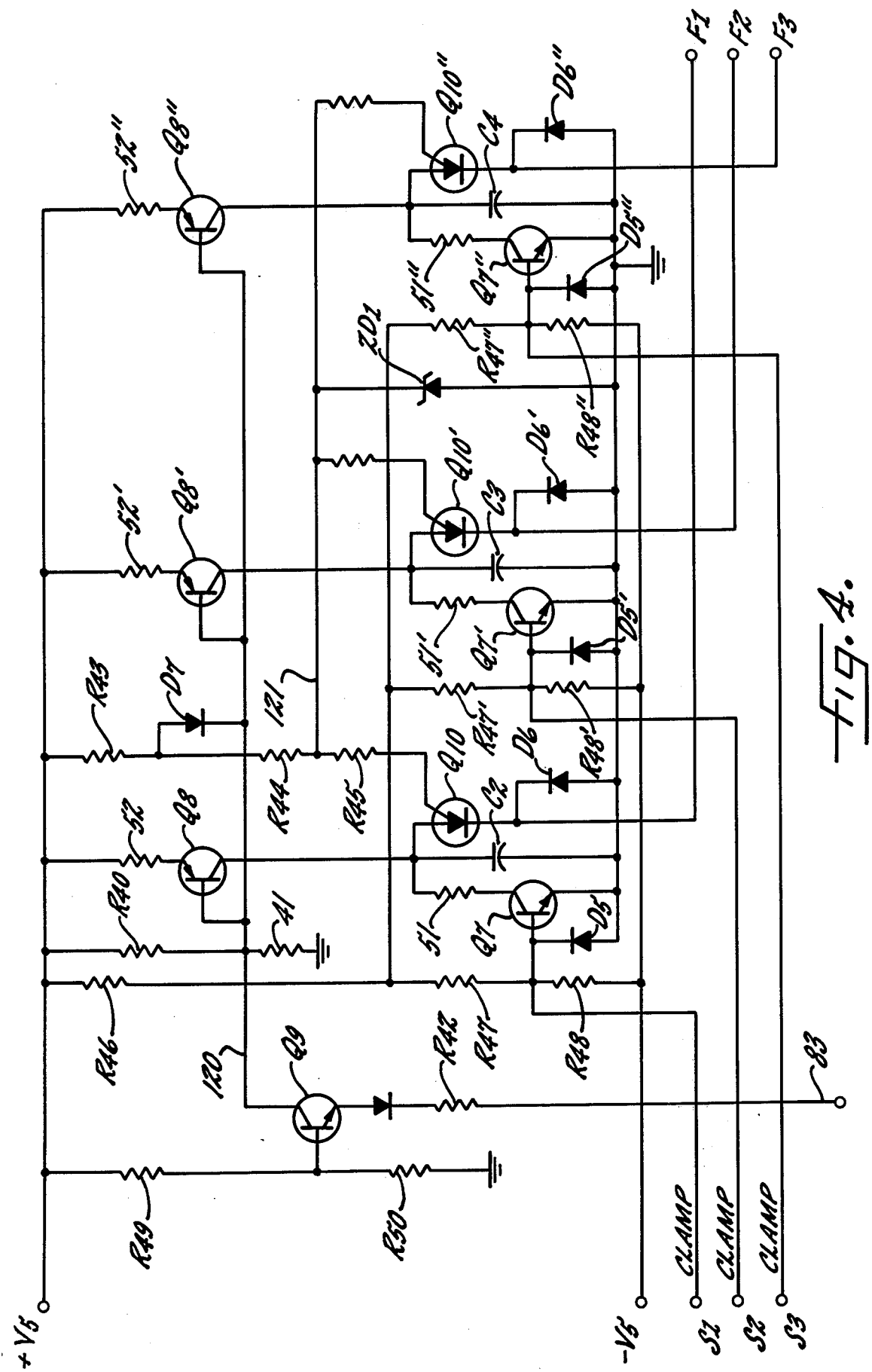
FIG. 4 is a circuit diagram of the firing circuits shown in block form in FIG. 2b.

Turning first to the forward control system, the signal on line 83 is supplied to a forward firing circuit 90 (shown in detail in FIG. 4). This firing circuit 90 includes three identical sub-circuits which receive sequential "sync" pulses from a forward synchronizing circuit 91 (shown in detail in FIG. 3), as well as the current control signal on line 83. The three sub-circuits generate sequential firing pulses which are supplied to the gates of three corresponding silicon-controlled rectifiers SCR1, SCR2 and SCR3 which control the transmission of three-phase a-c. power to the motor from a source 100 and supply lines 101, 102 and 103. The SCR's transmit power from the a-c. supply lines 101–103 to the motor armature 10 only during positive half cycles of the a-c. voltage, and only during certain portions of those half cycles as determined by the pulses from the firing circuit 90. Thus, the average level of current supplied to the motor is actually determined by the time relationship between the firing pulses and the respective a-c. voltages on the lines 101–103. For example, the maximum current will be supplied to the motor when the entire positive half cycles are passed by the SCR's, and the current level drops off as smaller portions of the positive half cycles are transmitted.

The time relationship between the firing pulses and the corresponding a-c. voltages on lines 101–103 is determined in the firing circuit 90 by the magnitude of the control signal on line 83. More specifically, the magnitude of this control signal adjusts the charging rate for timing capacitors C2, C3 and C4 (FIG. 4) in the three sub-circuits that produce the firing pulses, and the time required for these capacitors to charge to a predetermined level determines the instant when each firing pulse is initiated. The charging of the capacitors C2, C3 and C4 is always initiated at the same time, relative to the sinusoidal cycles of the corresponding a-c. voltages, and the firing pulses always have a constant width once they are initiated by the charging of one of the capacitors to a predetermined level. Thus, the only variable is the time required for each capacitor to charge to the level required to initiate a firing pulse, which in turn determines the time relationship between the firing pulses and the various phases of the a-c. supply.

To initiate the charging of each of the three timing capacitors C2, C3, and C4 in the firing circuit 90 at a preselected point in each positive half cycle of the corresponding sinusoidal waveform of the a-c. supply, the forward synchronizing circuit 91 generates "sync" pulses in response to successive cycles of each a-c. waveform. The synchronizing circuit 91 comprises three identical sub-circuits, each of which receives the a-c. voltages from two of the supply lines 101, 102 and 103 via transformers T1, T2 and T3, respectively. Thus, the first sub-circuit receives the voltages on lines 101 and 103 via transformers T1 and T3, the second sub-circuit receives the voltages on lines 101 and 102 via transformers T1 and T2, and the third sub-circuit receives the voltages on lines 102 and 103 via transformers T2 and T3. Of course, the waveforms of the a-c. voltages on the three lines 101-103 are all 60° out of phase with respect to each other.

Turning to the detailed diagram of the synchronizing circuit 91 in FIG. 3, only the first sub-circuit will be described in detail, but common elements have been identified in the other two sub-circuits in FIG. 3 by the same reference characters with the addition of a prime (') or double prime ("). Thus, the input signals to the first sub-circuit are the a-c. voltages on lines 101 and 102 (terminals A and F in FIGS. 2b and 3) which are passed through resistors R30 and R31 and summed at node 110. A capacitor C5 delays the resulting sum 15° after the a-c. voltage on line 101 swings positive, and then turns off a transistor Q4 via resistor R37, which turns on a transistor Q5. More specifically, the PNP transistor Q4 is turned on whenever its base voltage goes negative because a constant positive voltage is applied to its emitter from a supply +V4 via resistor R32, thereby forward biasing the emitter-base junction. However, when the base voltage goes positive and reverse biases the emitter-base junction, the transistor Q4 is turned off. In this connection, it should be noted that a diode D10 is connected in parallel with the base-collector junction of Q4 to ground, so that the maximum positive voltage seen by the base of Q4 is only one diode drop above ground (typically 0.6 volt).

The output of the synchronizing circuit is the voltage on line S1 which is connected via resistor R38 to the collector of transistor Q5. The collector voltage on Q5 is high as long as Q5 is held off by conduction of Q4. More particularly, whenever Q5 is off, the voltage level on its collector is the supply voltage +V4 minus the drop across a resistor R33. When the NPN transistor Q5 is turned on by an increase in its base voltage due to Q4 turning off, the output—the collector voltage on Q5—goes low. This is the beginning of a "sync" pulse.

When the voltage level on the base of Q4 goes negative, Q4 is turned on and Q5 is turned off, but the output (Q5 collector voltage) remains low because a transistor Q6 is also turned on by the sum of the two input signals, via resistors R34, R35 and R36, before Q5 is turned off. Capacitor C6 keeps Q6 turned on for 60° after the a-c. voltage on line 101 goes to zero at the end of each positive half cycle. When Q6 is turned off, the output (Q5 collector voltage) goes high again, terminating the "sync" pulse. Thus, it can be seen that each "sync" pulse produced by the first sub-circuit begins 15° after the beginning of each positive half cycle of the a-c. voltage on line 101, and continues throughout the balance of that positive half cycle and 60° into the succeeding negative half cycle. A diode D11 across the base-emitter junction of Q6 so that the maximum positive voltage seen by the base of Q6 is only one diode drop above ground.

This "sync" pulse is supplied via line S1 to one of the "clamp" inputs to the firing circuit 90, permitting the timing capacitor C2 in the corresponding portion of the firing circuit 90 to charge only while the "sync" pulse is present. Referring more particularly to FIG. 4, here again only one of the three identical sub-circuits will be described in detail, and corresponding elements in the other two sub-circuits are identified by common reference characters in FIG. 4 with the addition of a prime (') or double prime ("). The timing capacitor C2 in the first firing sub-circuit is discharged as long as its clamping transistor Q7 is turned on, and Q7 is on whenever the "clamp" signal on line S1 from the synchronizing circuit 91 is high. The actual voltage level on the base of Q7 is determined by a voltage divider formed by a series of resistors R46, R47 and R48 connected across the +V5 and −V5 supply terminals. A diode D5 across the base-emitter junction of Q7 limits the voltage on the base to one diode drop.

When the "clamp" signal goes low, at the beginning of a "sync" pulse, Q7 is turned off, and C2 begins to charge. It is the rate at which this timing capacitor C2 charges that determines when a firing pulse is supplied to SCR1. The capacitor C2 always charges to the same level, but the time required to reach that level depends on the charging current available, which in turn depends on the magnitude of the d-c. control signal on line 83.

The value of the charging capacitor C2 is chosen so that the slowest charging rate produces a maximum charging time that lasts until the end of the positive half cycle of the a-c. voltage on line 101 that initiated the unclamping "sync" pulse. This slow charging rate is caused by a low control signal on line 83, and results in zero armature current because the firing pulse does not reach SCR1 until the corresponding a-c. voltage on line 101 has swung negative, and the SCR can pass only positive voltages. This situation is the first of three examples illustrated by the three sets of waveforms in FIG. 5. That is, the charging ramp RP1 for the timing capacitor C2 is initiated by the leading edge of the sync pulse P1, which appears 15° after the beginning of a positive half cycle of the a-c. voltage E1. Because of the slow charging rate illustrated by the ramp RP1, the timing capacitor does not charge to the level $V_f$ required to initiate a firing pulse until after the voltage E1 has swung negative. Consequently, the resulting firing pulse F1 is produced after the corresponding positive half cycle of the voltage E1 has terminated, and so SCR1 transmits zero power to the motor.

Figure 5:
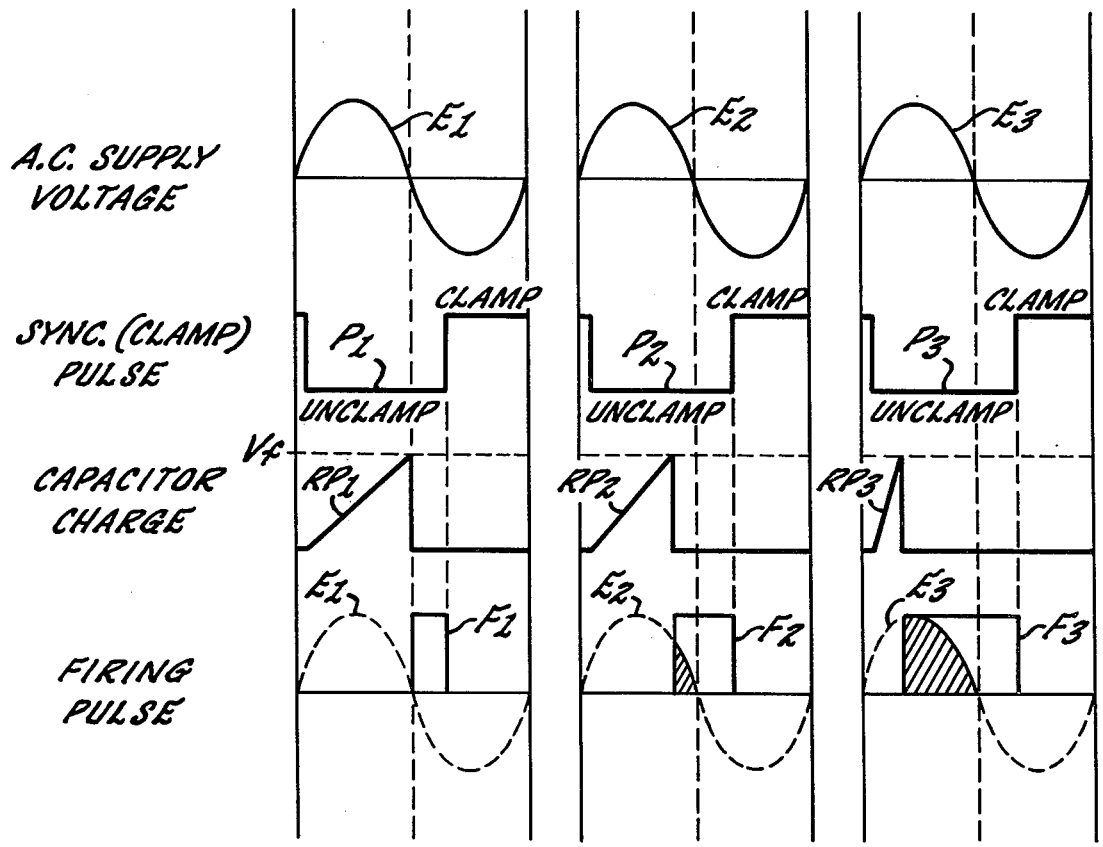
FIG. 5 is a series of waveforms illustrating the operation of the system shown in FIGS. 2 through 4.

In the second example illustrated in FIG. 5, the timing capacitor charges at a faster rate, illustrated by ramp RP2, due to a higher control signal on line 82. As a result, the capacitor is charged to the level Vf 30° before the voltage E1 swings negative, so during the last 30° of the positive half cycle of E1 (the shaded area in FIG. 5) power is transmitted to the motor armature.

In the third example shown in FIG. 5, a still higher control signal on line 83 causes the timing capacitor to charge at an even faster rate, illustrated by ramp RP3. This time the capacitor reaches level Vf 110° before the voltage E1 swings negative, so during the final 110° of the positive half cycle of E1 (the shaded area in FIG. 5) power is transmitted to the motor armature.

The timing capacitor C2 (FIG. 4) receives its charging current from a constant current source comprising a transistor Q8 having its emitter connected via resistor R52 to a voltage supply +V5 and its base connected to a charging-rate-control signal line 120. It is the voltage level on this line 120, which is limited by a diode D7, that determines the amount of current flow through the transistor Q8. This voltage level is determined by a voltage divider comprising a resistor R40 and the parallel combination of a resistor R41 leading to ground and a transistor Q9 and resistor R42 leading to the control signal input line 83. The base voltage on the transistor Q9 is fixed by a pair of resistors R49 and R50 connected between terminal +V5 and ground, so the voltage level on line 83, which is the input control signal, determines the resistance of the branch containing Q9 and thereby controls the level of the charging-rate-control voltage on line 120. This voltage level on line 120 in turn controls the current flow through Q8, thereby controlling the charging rate of the timing capacitor C2 so that the timing of the firing pulse, and thus the magnitude of the armature current level, is proportional to the level of the signal on line 120.

To produce a firing pulse when the timing capacitor C2 reaches its predetermined "full" charge Vf, a programmable unijunction transistor (PUT) Q10 has its anode connected to the positive side of C2, and its cathode is connected to the gate of SCR1 through line F1 and a transformer T4. The gate of the PUT Q10 is connected via R45 to a reference voltage established on a line 121 by a pair of resistors R43 and R44 and a Zener diode ZD1 connected between the supply voltage +V5 and ground. A PUT turns on when its anode potential exceeds its gate potential by one diode drop. In the illustrative circuit, the gate potential is fixed, and the anode potential is controlled by the timing capacitor C2, so the PUT Q10 fires when the charge on C2 rises one diode drop above the fixed gate potential.

This firing of the PUT produces a firing pulse on line F1 which turns on SCR1, and both the PUT Q10 and SCR1 remain on until the clamping transistor Q7 is turned on again at the end of the "sync" pulse. That is, when the "clamp" signal goes high, Q7 is turned on, discharging C1 through resistor R51 and turning off the PUT Q10 and SCR1. Before this occurs, of course, the a-c. voltage on line 101 has already swung negative, and so the current flow through SCR1 to the motor armature has already terminated. However, by delaying the turn-off of PUT Q10 until after the a-c. supply voltage has swung negative, it is assured that current flows to the armature during the entire portion of the positive half cycle that remains at the instant when the firing pulse is initiated. A diode D6 limits the voltage level on line F1 to one diode drop from ground.

The transformer coupling (via T4) of the firing pulse to the gate of SCR1 ensures that only the firing pulse reaches the SCR gate. That is, the transformer T4 blocks any d-c. signal due to continued conduction of the PUT. The SCR, of course, remains on until the power signal at its anode swings negative.

It will be appreciated that the firing of the other two "forward" driving SCR's, namely SCR2 and SCR3, is controlled by the other two firing sub-circuits in the same manner described above for SCR1. That is, SCR2 is controlled by the sub-circuit containing the capacitor C3, and SCR3 is controlled by the sub-circuit containing the capacitor C4. All three SCR's have RC circuits in parallel therewith for noise suppression.

It will also be appreciated that the reverse drive system works in exactly the same manner as the forward drive system, except that the three "reverse" SCR's (SCR4, SCR5 and SCR6) are arranged to conduct during negative rather than positive half cycles of the a-c. voltages on lines 101–103. That is, each SCR functions as a half-wave rectifier, with SCR1, SCR2 and SCR3 passing portions of only the positive half cycles to drive the motor in one direction, and SCR4, SCR5 and SCR6 passing portions of only the negative half cycles to drive the motor in the opposite direction. The counterpart of the forward firing control signal on line 83 is the reverse firing control signal on line 85, which is supplied to the reverse firing circuit 90'. The "sync" pulses for the reverse firing circuit 90' are supplied from a synchronizing circuit 91' which receives the same inputs that are supplied to the circuit 91, but the timing is all with reference to the negative half cycles rather than the positive half cycles.

Whenever one of the SCR's is turned on, the corresponding a-c. power signal is supplied to the motor armature through a choke coil L1 or L1'. This coil reduces the high frequency noise that is typically generated by the switching of SCR's, prevents the SCR's from shorting out in the event that a pair of oppositely poled SCR's were to fire at the same time, and in general provides a smoother power signal to the motor armature 10. It will be understood that the current supplied to the armature 10 by the SCR's is not a smooth d-c. current, but the inertia of the motor "filters" the fluctuating power input to produce a smooth mechanical output at the motor shaft.

As can be seen from the foregoing detailed description, the improved electric torquing device provided by this invention is capable of achieving a preselected torque level with a high degree of reliability and uniformity over a large number of torquing operations. This torquing system provides an unusually low level of torque "scatter" over a large number of repetitive torquing operations. It also minimizes inertial effects due to the velocity and acceleration of the torquing spindle in the final stage of a torquing operation. The final torque on the workpiece is substantially independent of the velocity, acceleration and inertia of the torquing spindle. This torquing system produces a precisely controlled and constant torque output, which stops at the desired final torque level with negligible overshoot, undershoot, or spring-back. The torquing operation effected by this improved device is also extremely rapid.

We claim as our invention:

1. An electric torquing device comprising
    (a) a d-c. motor for producing an output torque that varies in proportion to variations in the armature current,
    (b) a power source for supplying d-c. current to said armature to produce an output torque,
    (c) regulating means for maintaining said d-c. current at a relatively low level during the run-on stage of a torquing operation,
    (d) sensing means responsive to a preselected parameter of the torquing operation for producing a control signal when the tightening stage of the torquing operation begins,
    (e) and control means responsive to the control signal from said sensing means for adjusting the regulation of said d-c. current to maintain the current supply to said armature at a relatively high level during the tightening stage of the torquing operation, said control means including
        (1) torque reference signal generating means for producing a signal representing a torque limit for the tightening stage of the torquing operation,
        (2) armature current sensing means for producing a signal representing the actual magnitude of the armature current during the torquing operation,
        (3) said regulating means being responsive to said torque limit reference signal and said actual armature current signal for supplying current to the motor armature during the tightening stage at a magnitude proportional to the difference between said torque reference signal and said actual armature current signal to increase the actual torque output of the motor, (f) and terminating means for de-energizing the motor in response to a preselected parameter of the torquing operation.

2. An electric torquing device as set forth in claim 1 wherein said terminating means comprises means for de-energizing the motor in response to attainment of said preselected final torque output from the motor.

3. An electric torquing device as set forth in claim 1 which includes velocity sensing means for producing a signal representing the actual velocity of the motor output, velocity reference signal generating means for producing a signal representing a preselected maximum velocity for the torquing operation, control means responsive to both the actual and the reference velocity signals for producing a velocity error signal representing the difference between the actual and reference velocities, and said regulating means is responsive to said velocity error signal for controlling the current supply to the motor armature during the run-on stage of the torquing operation.

4. An electric torquing device as set forth in claim 1 wherein said sensing means responsive to a preselected parameter of the torquing operation comprises means for sensing a stalled condition of the motor and producing a control signal indicating the stalled condition has occurred.

5. An electric torquing device as set forth in claim 1 wherein said regulating means comprises a differential amplifier receiving said torque limit reference signal and said actual armature current signal and producing an armature current error signal representing the difference between said torque limit reference signal and said actual armature current signal, and means responsive to said armature current error signal for controlling the magnitude of the current supplied to said motor armature.

6. An electric torquing device comprising (a) a d-c. motor for producing an output torque that varies in proportion to variations in the armature current, (b) a power source for supplying d-c. current to said armature to produce an output torque, (c) regulating means for maintaining said d-c. current at a relatively low level during the run-on stage of a torquing operation, said regulating means including (1) a differential amplifier receiving said torque limit reference signal and said actual armature current signal and producing an armature current error signal representing the difference between said torque limit reference signal and said actual armature current signal, and (2) means responsive to said armature current error signal for controlling the magnitude of the current supplied to said motor armature, (d) means for sensing a stalled condition of the motor and producing a control signal indicating the stalled condition has occurred, (e) control means responsive to the control signal from said sensing means for adjusting the regulation of said d-c. current to maintain the current supply to said armature at a relatively high level during the tightening stage of the torquing operation, said control means including (1) torque reference signal generating means for producing a signal representing a torque limit for the tightening stage of the torquing operation, (2) armature current sensing means for producing a signal representing the actual magnitude of the armature current during the torquing operation, (3) said regulating means being responsive to said torque limit reference signal and said actual armature current signal for supplying current to the motor armature during the tightening stage at a magnitude proportional to the difference between said torque reference signal and said actual armature current signal to increase the actual torque output of the motor, (f) and terminating means for de-energizing the motor in response to attainment of said preselected final torque output from the motor.

* * * * *